(12) United States Patent
Kunert

(10) Patent No.: US 10,006,537 B2
(45) Date of Patent: Jun. 26, 2018

(54) GEARED MOTOR SERIES

(71) Applicant: SIEMENS AKTIENGESELLSCHAFT, München (DE)

(72) Inventor: Jens Kunert, Tübingen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 81 days.

(21) Appl. No.: 14/394,936

(22) PCT Filed: Apr. 15, 2013

(86) PCT No.: PCT/EP2013/057818
§ 371 (c)(1),
(2) Date: Oct. 16, 2014

(87) PCT Pub. No.: WO2013/156446
PCT Pub. Date: Oct. 24, 2013

(65) Prior Publication Data
US 2015/0068360 A1 Mar. 12, 2015

(30) Foreign Application Priority Data

Apr. 17, 2012 (EP) ..................... 12164446

(51) Int. Cl.
*F16H 3/02* (2006.01)
*F16H 57/033* (2012.01)
*F16H 57/02* (2012.01)

(52) U.S. Cl.
CPC . *F16H 57/033* (2013.01); *F16H 2057/02069* (2013.01); *F16H 2057/0335* (2013.01); *Y10T 74/19167* (2015.01)

(58) Field of Classification Search
CPC ......... F16H 37/043; F16H 55/17; F16H 57/12
(Continued)

(56) References Cited

U.S. PATENT DOCUMENTS 4,969,860 A * 11/1990 Takami ..................... F16H 3/74
475/16
5,651,747 A * 7/1997 Minegishi ................. F16H 1/32
475/176

(Continued)

FOREIGN PATENT DOCUMENTS

| DE | 103 12 941 | 12/2004 |
|----|-----------|---------|
| EP | 0 452 739 | 10/1991 |
| EP | 1 215 417 | 6/2002 |

OTHER PUBLICATIONS

International Search Report issued by the European Patent Office in International Application PCT/EP2013/057818.

(Continued)

*Primary Examiner* — Ha Dinh Ho
(74) *Attorney, Agent, or Firm* — Henry M. Feiereisen LLC

(57) ABSTRACT

A gear motor series has two pinions with different numbers of teeth ($z1a$, $z1b$), and several toothed wheels with different numbers of teeth ($z2a$, $z3a$, $z4a$). The pinions and the toothed wheels are designed such that each pinion, in several predetermined axial distances (a), can be paired with one of the toothed wheels in order to form a first gear stage. One individual toothed wheel is provided for each predetermined axial distance (a), which is embodied such that it can be optionally paired with the one pinion or with the other pinion to form a first gear stage.

7 Claims, 4 Drawing Sheets

(58) Field of Classification Search
USPC .................................... 74/745, 421 R, 460
See application file for complete search history.

(56) References Cited

U.S. PATENT DOCUMENTS

| | | | |
|---|---|---|---|
| 7,418,888 B2* | 9/2008 | Vialle | B64C 27/14 244/17.25 |
| 7,832,299 B2* | 11/2010 | Kobayashi | F16H 3/006 74/329 |
| 2009/0133521 A1 | 5/2009 | Kunert et al. | |

OTHER PUBLICATIONS

Boeing, U.S. Pat. No. 8,176,806, May 15, 2012, 2010/0229678, Sep. 16, 2010.

* cited by examiner

FIG 1  Prior Art

| Determination of $z_2$ | | | | | | |
|---|---|---|---|---|---|---|
| | | | | a | 70 | 80 | 90 |
| | m_n | x_1 | z_1 | z_2 | z_3 | z_4 |
| a | 2 | 0,4 | 16 | 44 | 52 | 61 |
| b | 2 | 0,4 | 17 | 43 | 51 | 60 |

| Determination of $x_2$ | | | | | | |
|---|---|---|---|---|---|---|
| | | | | a | 70 | 80 | 90 |
| | m_n | x_1 | z_1 | x_2 | x_3 | x_4 |
| a | 2 | 0,4 | 16 | -0,231 | 0,1777 | -0,038 |
| b | 2 | 0,4 | 17 | 0,3663 | 0,7748 | 0,5594 |

| Specification/determination of Asn | | | | | | |
|---|---|---|---|---|---|---|
| | | | | a | 70 | 80 | 90 |
| | m_n | Asn1 | z_1 | Asn2 | Asn3 | Asn4 |
| a | 2 | -0,05 | 16 | -0,07 | -0,07 | -0,07 |
| b | 2 | -0,05 | 17 | -0,07 | -0,07 | -0,07 |

| Determination of angle of play theta | | | | | | |
|---|---|---|---|---|---|---|
| | | | | a | 70 | 80 | 90 |
| | m_n | x_1 | z_1 | theta2 [°] | theta3 | theta4 |
| a | 2 | 0,4 | 16 | 0,1563 | 0,1322 | 0,1127 |
| b | 2 | 0,4 | 17 | 0,1573 | 0,1329 | 0,1131 |

| Transmission achieved | | | | | | |
|---|---|---|---|---|---|---|
| | | | | a | 70 | 80 | 90 |
| | m_n | x_1 | z_1 | i=z2/z1 | | |
| a | 2 | 0,6 | 16 | 2,75 | 3,25 | 3,81 |
| b | 2 | 0,0029 | 17 | 2,53 | 3,00 | 3,53 |

FIG 2

| Determination of z2 | | | | | | | |
|---|---|---|---|---|---|---|---|
| | | | | a | 70 | 80 | 90 |
| | m_n | x_1 | z_1 | | z_2 | z_3 | z_4 |
| a | 2 | 0,6 | 16 | | 44 | 52 | 61 |
| b | 2 | 0,0029 | 17 | | 44 | 52 | 61 |

| Determination of x2 | | | | | | | |
|---|---|---|---|---|---|---|---|
| | | | | a | 70 | 80 | 90 |
| | m_n | x_1 | z_1 | | x_2 | x_3 | x_4 |
| a | 2 | 0,6 | 16 | | -0,231 | 0,1777 | -0,038 |
| b | 2 | 0,0029 | 17 | | -0,217 | 0,1618 | -0,036 |

| Specification/determination of Asn | | | | | | | |
|---|---|---|---|---|---|---|---|
| | | | | a | 70 | 80 | 90 |
| | m_n | Asn1 | z_1 | | Asn2 | Asn3 | Asn4 |
| a | 2 | -0,05 | 16 | | -0,07 | -0,07 | -0,07 |
| b | 2 | -0,05 | 17 | | -0,05 | -0,093 | -0,068 |

| Determination of angle of play theta | | | | | | | |
|---|---|---|---|---|---|---|---|
| | | | | a | 70 | 80 | 90 |
| | m_n | x_1 | z_1 | | theta2 [°] | theta3 | theta4 |
| a | 2 | 0,6 | 16 | | 0,1563 | 0,1322 | 0,1127 |
| b | 2 | 0,0029 | 17 | | 0,1308 | 0,1577 | 0,1105 |

| Difference abs (theta2a-theta2b) | | | | |
|---|---|---|---|---|
| b | | MAX: 0,0255 | 0,0255 | 0,0255 | 0,0022 |

| Transmission achieved | | | | | | | |
|---|---|---|---|---|---|---|---|
| | | | | a | 70 | 80 | 90 |
| | m_n | x_1 | z_1 | | i=z2/z1 | | |
| a | 2 | 0,6 | 16 | | 2,75 | 3,25 | 3,81 |
| b | 2 | 0,0029 | 17 | | 2,59 | 3,06 | 3,59 |

GEARED MOTOR SERIES

CROSS-REFERENCES TO RELATED APPLICATIONS

This application is the U.S. National Stage of International Application No. PCT/EP2013/057818, filed Apr. 15, 2013, which designated the United States and has been published as International Publication No. WO 2013/156446 and which claims the priority of European Patent Application, Serial No. 12164446.2, filed Apr. 17, 2012, pursuant to 35 U.S.C. 119(a)-(d).

BACKGROUND OF THE INVENTION

The present invention relates to a geared motor series having two pinions with different numbers of teeth, and a plurality of toothed wheels with different numbers of teeth, the pinions and the toothed wheels being designed such that each pinion, in a plurality of predetermined axial distances, can be paired with one of the toothed wheels in order to form a first gear stage.

Geared motor series of the type described above are already known in the prior art. They form an assembly kit of individual components from which different geared motors can be assembled which differ from each other with respect to the motor dimension, the transmissions achieved in the gear and the like. Very high variance in the transmissions of a gear is primarily achieved by way of a large number of different transmissions in the first motor-side transmission stage. Intermediate and end stages of a gear tend to have low variance on the other hand. The total number of toothed parts required is therefore principally shaped by the first stage. For cost reasons geared motor manufacturers are constantly striving to keep the number of individual components of a geared motor series as low as possible.

A reduction in the individual components of a geared motor series has previously been primarily achieved by having one pinion at as many different axial distances as possible, with one separate toothed wheel being provided per pinion for each axial distance. Therefore, two different transmissions can be achieved with two pinions and two toothed wheels for a first axial distance. Another two transmissions can be achieved for each additional axial distance using the same pinions and two additional toothed wheels. The variance in the pinions, and therefore the number of individual components, of a geared motor series is considerably reduced in this way.

Examples of such geared motor series are disclosed in documents EP 1 215 417 A2, EP 0 452 739 A1 and DE 103 12 941 A1.

SUMMARY OF THE INVENTION

Starting from this prior art, the present invention further reduces the number of individual components of a geared motor series of this type without restricting the variance achievable thereby.

To achieve this object the present invention creates a geared motor series of the type mentioned in the introduction which is characterized in that one individual toothed wheel is provided for each predetermined axial distance, which is embodied such that it can be optionally paired with the one pinion or with the other pinion to form a first gear stage. As a result of this construction of the inventive geared motor series two different transmissions can be achieved with the two pinions and one individual toothed wheel in the case of a first axial distance. Another two transmissions can be achieved for each additional axial distance using the same pinions and one additional toothed wheel. In this way a large variance is achieved with a very low number of individual components, and this is associated with very low costs.

The number of teeth on the two pinions preferably differs from each other by one tooth, so the following applies: $z1a=z1b+1$.

According to one embodiment of the present invention the addendum gear modification coefficients of the two pinions are chosen in such a way that the respective difference between the backlash angles, which are adjusted in each case during cogging between the individual toothed wheel provided for each predetermined axial distance and the two pinions, satisfies previously defined acceptance criteria in the case of a plurality of predetermined axial distances, with the difference advantageously being minimal. The cogging components are optimally adjusted to each other accordingly.

According to one embodiment of the present invention the acceptance criteria include a backlash difference from the standard value close to zero and/or adherence to a desired transmission ratio and/or the attainment of required strength values.

BRIEF DESCRIPTION OF THE DRAWING

Further advantages and features of the present invention will become clear with the aid of the following description of an embodiment of an inventive geared motor series which makes reference to the accompanying drawings, in which:

FIG. 1 shows a tabular view of individual parameters that may be achieved by known geared motor series by using two pinions and various toothed wheels in the first gear stage.

FIG. 2 shows a tabular view of individual parameters of a first gear stage of a geared motor series according to an embodiment of the present invention that may be achieved with two pinions and various toothed wheels, FIG. 3 illustrates the structure of a prior art gear series in accordance with any one of the many gear pairings disclosed applicant's FIG. 1. Alternatively, an analogous gear series having the parameters show in FIG. 2 can advantageously be provided in accordance with the present invention to further reduce the number of different components therein without reducing the variance provided by the gear series, as previously noted.

DETAILED DESCRIPTION OF PREFERRED EMBODIMENTS

It will be explained by way of example below how the parameters, listed in FIG. 1, of the known geared motor series can be changed to achieve an inventive geared motor series.

Figure 3:
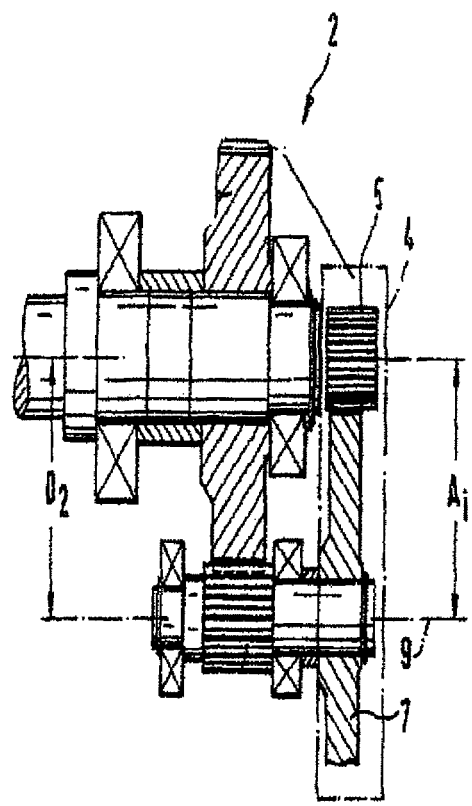
FIG. 3 shows a highly schematic cross-sectional view of a known example of a geared motor transmission series that is shown in FIG. 1 of EP 0 452 739 A1 of the prior art cited above.
Figure 4:
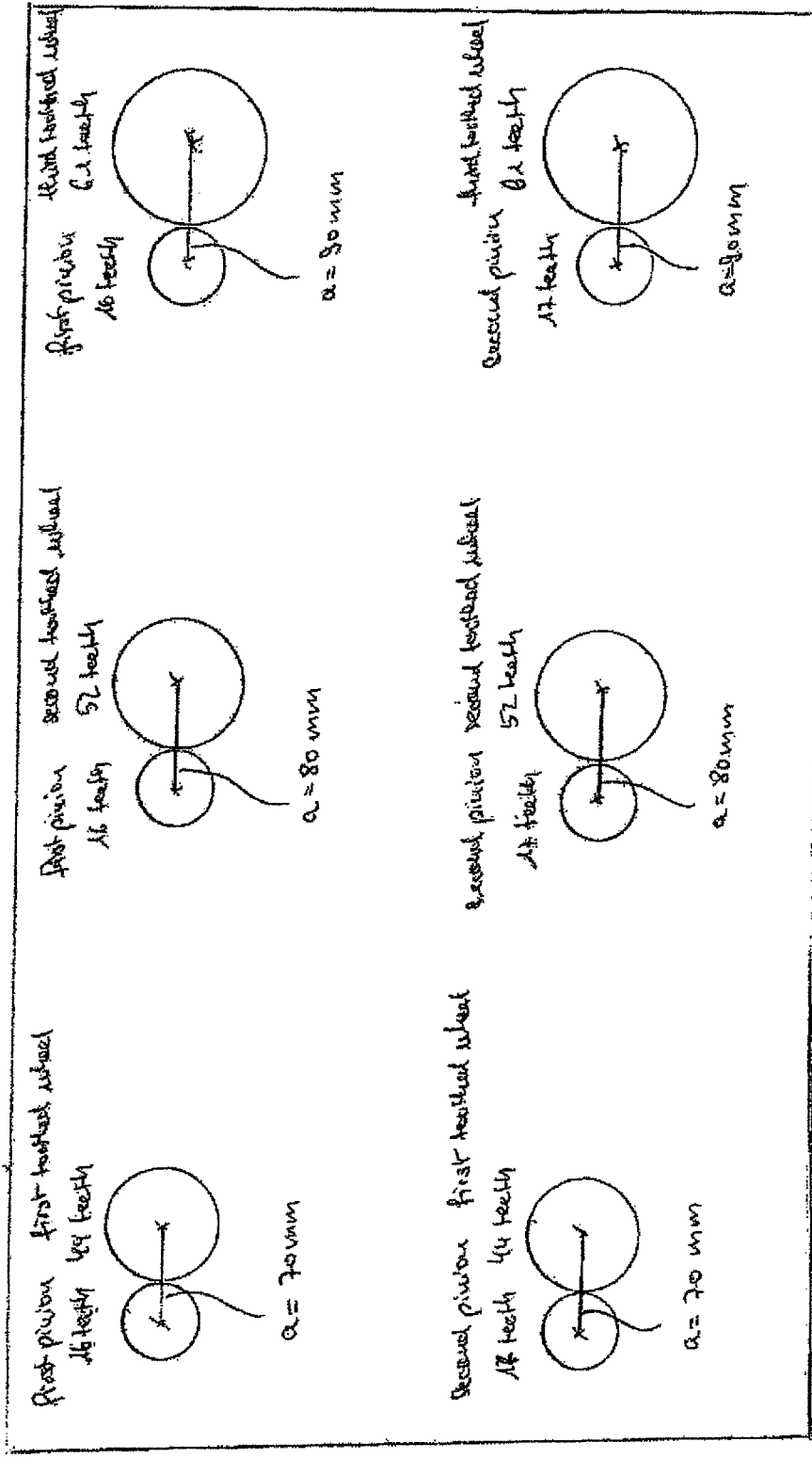
FIG. 4 shows a diagram illustration of individual parameters of a first gear stage of a geared motor series according to an embodiment of the present invention that may be achieved with two pinions and various toothed wheels.

In FIG. 1 a known geared motor series comprises a variable first gear stage 3 which comprises two pinions designated "a" and "b" (only one pinion 5 is shown in FIG. 3. The two pinions of the variable first gear stage 3, have different numbers of teeth $z1a$ and $z1b$, where $z1a=16$ and $z1b=17$. Both pinions, having the teeth $z1a$ and $z1b$, respectively, have the same axial distance "A" between the centers of the pinion and gear shafts as stated in FIG. 1 and FIG. 2, and shown in FIG. 3, which is referred to as the parameter "a" in those tables. The pinions also have the same normal module "mn", where mn=2 mm.

In FIG. 1, a toothed wheel 7 having a number of teeth z2a=44 is provided at the axial distance a=70 mm for the pinion 5 having the number of teeth z1a. A further toothed wheel (not shown) having the number of teeth z2b=43 is associated with another pinion (not shown) having the number of teeth z1b at the same axial distance a=70 mm. By pairing the pinion 5 having the number of teeth z1a with the toothed wheel 7 having the number of teeth z2a. or else pairing the pinion (not shown) having the number of teeth z1b with the toothed wheel (not shown) having a number of teeth z2b in the variable first gear stage 3, either one of two different transmissions can be alternatively implemented at that same axial distance a=70 mm. For the axial distance a=80 mm there are two additional toothed wheels (not shown) with numbers of teeth z3a=52 and z3b=51, and for the axial distance a=90 mm two toothed wheels (not shown) with the number of teeth z4a=61 and z4b=60 are provided in FIG. 1. Overall, six different transmissions i are known to be possible for the variable first gear stage 3 shown in FIG. 3, using the table of transmission parameters that is shown in FIG. 1.

In contrast to the table of transmission parameters that is shown in FIG. 1, requiring six toothed wheels that have six different numbers of teeth, the invention illustrated by the table of parameters shown in FIG. 2, requires only three different toothed wheels that have three different numbers of teeth in accordance with the present invention.

With $x2=(z1+z2)*(inv(\alpha wt)-inv(\alpha t))/(2*\tan(\alpha n))-x1$ and $\alpha wt=\arccos(mn*(z1+z2)*\cos(\alpha t)/\cos(\beta)/2/a)$ and $\alpha t=\arctan(\tan(\alpha n)/\cos(\beta))$ the addendum gear modification coefficients x2a, x2b, x3a, x3b, x4a and x4b listed in the table result in the case of the predetermined values for x1, αn, β, mn, z1 and z2, where "αwt" is the operating pressure angle, "αt" the real pressure angle, "αn" the normal pressure angle, "β" the helix angle, "mn" the normal module and "a" the axial distance.

The tooth thickness dimensions Asn follow agreed specifications for a desired circumferential backlash and can be taken by way of example from appropriate standards such as DIN 3967.

With $$v2=2*jt/dw2$$

and $$jt=-(Asn1=Asn2)/\cos(\beta)$$

and $$dw2=2*a*z2(z1+z2)$$

the backlash angle v2 is determined, where for the sake of clarity the displaying of additional, but in this case irrelevant, variables influencing the backlash, such as the axial distance tolerance, has been omitted. jt is the theoretical backlash, Asn the chosen tooth thickness dimension and dw2 the pitch circle diameter of the wheel. The backlash angle shown here therefore applies in the case of measurement on the wheel.

The additional data, given in the table, for the two pinions and the six toothed wheels as well as the values for the backlash angle v2 of the six transmissions i result by specifying the values for x1, αn, β, mn, z1 and z2 and appropriate choice of the tooth thickness dimensions Asn.

With a total of eight individual components, six different transmissions can be achieved with a geared motor series of this kind, as emerges from the last block of the table.

Analogously to FIG. 1, FIG. 2 shows a tabular view of the parameters described above, with the parameters having been modified in such a way however that a first gear stage of a geared motor series according to one embodiment of the present invention results.

The starting point is again two pinions with the numbers of teeth z1a=16 and z1b=17, which have the same normal module mn=2. In contrast to the table shown in FIG. 1, however, the addendum gear modification coefficients x1a and x1b are adjusted in such a way that across a plurality of wheels and axial distances there is simultaneously only a slight difference from the backlash illustrated earlier. For this purpose x1a is chosen so as to be sufficiently large and x1b sufficiently small for z1a<z1b, as is the case at hand. In the present example x1a=0.6 and x1b=0.0029. For the axial distances a=70 mm, a=80 mm and a=90 mm only one individual toothed wheel respectively with the number of teeth z2 is provided which can cog with the two pinions to achieve different transmissions i, where the following applies in the present case: z2a=z2b=44; z3a=z3b=52 and z4a=z4b=61.

The addendum gear modification coefficients x2a, x2b, x3a, x3b, x4a and x4b listed in the table result by way of calculation with the addendum gear modification coefficients x1 of the two pinions and numbers of teeth z2, z3, z4 of the three toothed wheels. The design should be such that the addendum pear modification coefficients x2a and x2b are approximately equal. The same applies to the addendum pear modification coefficients x3a and x3b and x4a and x4b.

An altered circumferential backlash is produced by the remaining difference between x2a and x2b, x3a and x3b and x4a and x4b. This can be expressed as the change in the tooth thickness dimension at the wheel ΔAsn2, ΔAsn3 and ΔAsn4. The value of the change in the tooth thickness dimension can be calculated as follows:

$$\Delta Asn2=|(x2a-x2b)*mn*\tan(\alpha n)|$$

The same applies to ΔAsn3 and ΔAsn4.

If the design has produced acceptable differences in the circumferential backlash across all axial distances a considered, then the two toothed wheels for each axial distance a according to the table in FIG. 1 can be replaced by one individual toothed wheel respectively, as can be seen in the table in FIG. 2. One individual toothed wheel with two pinions can therefore be paired for each axial distance a, whereby two transmissions i respectively can be achieved, as is shown in the last block of the table in FIG. 2. In addition to the purely geometric boundary conditions, by way of example the avoidance of jamming of the wheels, for which reason the total backlash must be greater than zero, acceptance criteria are the exceeding or falling below of a desired backlash, the attainment of a desired transmission range, the attainment of required strength values and the like.

If this procedure is applied over as many different pinions z1a and z1b and axial distances a of the first stage of a geared motor series as possible, then an accordingly increased saving potential results. Due to the high number of boundary conditions a numerical way of proceeding is recommended in each case for the selection of optimum values for x1a and x1b, where it is assumed in the present case that the additional geometric data already exists. It is stated by way of example as a boundary condition in the table according to FIG. 2 that the difference $|v2a-v2b|$ should be $\leq 0.0255$.

In the preferred iterative procedure described above values for x1 have been chosen and values for x2 calculated on the basis of this choice. Alternatively, values can of course analogously be chosen for x2 and then the values calculated for x1. In this case the following then applies $$X1=(z1+z2)*(\mathrm{inv}(\alpha wt)-\mathrm{inv}(\alpha t))/(2*\tan(\alpha n))-x2$$

The geared motor series according to the present invention is characterized in particular in that a large number of different transmissions can be achieved in the first gear stage with few individual components, so an inexpensive geared motor series is provided.

Although the invention has been illustrated and described in detail by the preferred exemplary embodiment, it is not limited by the disclosed examples and a person skilled in the art can derive other variations herefrom without departing from the scope of the invention.

The invention claimed is:

1. A geared motor series having a first gear stage, said first gear stage comprising:
   two pinions having respective different numbers of teeth; and
   a plurality of toothed wheels for a plurality of respective predetermined respective axial distances, said toothed wheels having respective different numbers of teeth,
   wherein each of the toothed wheels is configured such that each toothed wheel can be paired with either one of the pinions in the first gear stage, one toothed wheel being provided for each of the predetermined axial distances and configured for optional pairing with either one of the pinions in the first gear stage.

2. The geared motor series of claim 1, wherein a number of teeth on the two pinions differs by one tooth.

3. The geared motor series of claim 1, wherein addendum gear modification coefficients of the two pinions are chosen in such a way that the difference between their respective backlash angles during cogging between the toothed wheel provided for each predetermined axial distance and each respective one of the two pinions, satisfies defined acceptance criteria.

4. The geared motor series of claim 3, wherein the acceptance criteria include a backlash angle difference having a standard value close to zero.

5. The geared motor series of claim 3, wherein the acceptance criteria include adherence to a desired transmission ratio.

6. The geared motor series of claim 3, wherein the acceptance criteria include attainment of required strength values.

7. The geared motor series of claim 3, wherein addendum gear modification coefficients of the two pinions are chosen in such a way that the respective difference between the backlash angles that are adjusted during cogging between the toothed wheel provided for each predetermined axial distance and each one of the two pinions is minimal for a plurality of predetermined axial distances.

* * * * *